Nov. 26, 1957     E. H. FOSTER     2,814,337
INDICATING SYSTEM FOR LIQUID RESERVOIRS
Filed Aug. 4, 1955
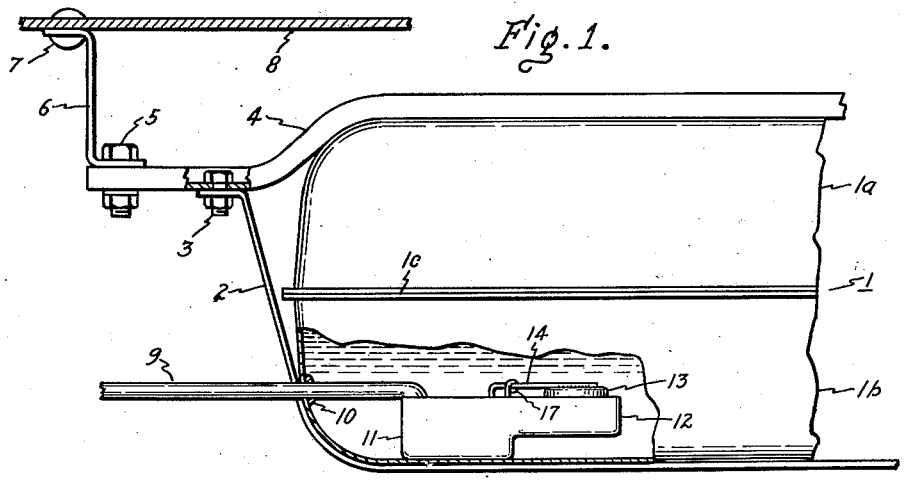
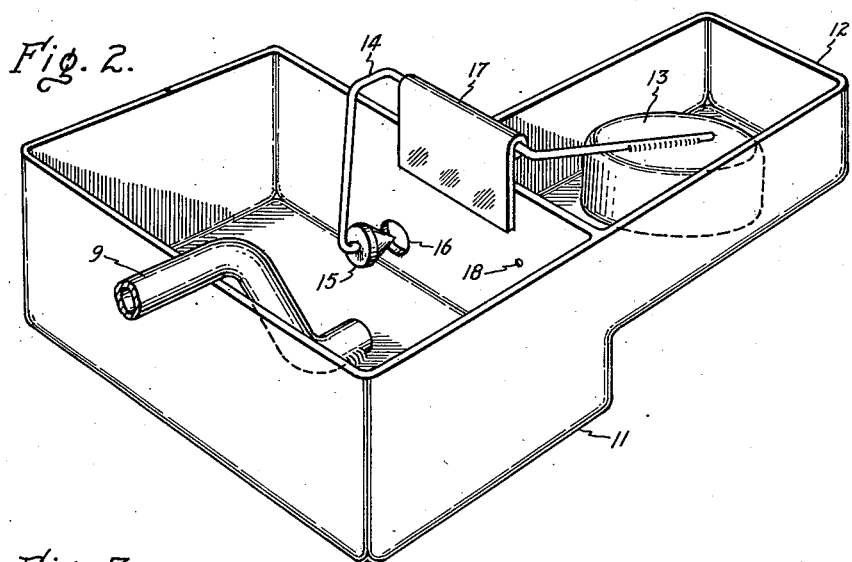
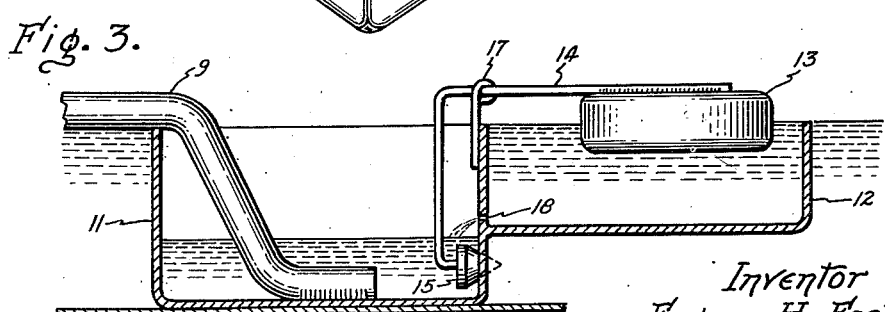
Inventor
Eugene H. Foster,
by Walter M. Rodgers Jr.
His Attorney.

United States Patent Office 2,814,337
Patented Nov. 26, 1957

2,814,337
INDICATING SYSTEM FOR LIQUID RESERVOIRS

Eugene H. Foster, East Point, Ga.

Application August 4, 1955, Serial No. 526,371

5 Claims. (Cl. 158—46.5)

This invention relates to indicating systems for liquid reservoirs and more particularly to a system for use in conjunction with reservoirs for liquid fuels whereby the rate of flow of fuel through the reservoir outlet is substantially reduced or effectively stopped when the level of liquid is reduced to a predetermined value so as materially to interfere with the normal functioning of the device using fuel supplied from the reservoir and thereby to afford an unmistakable indication of the condition of the supply of fuel in the reservoir. Thereafter a normal rate of flow of fuel is restored according to a feature of the invention so that normal operation of the device using fuel supplied from the reservoir is again made possible, it being desirable of course to replenish the fuel supply in the reservoir before the complete exhaustion thereof.

While motor vehicles using gasoline for fuel are customarily provided with gauges for indicating the condition of the fuel supply in the fuel tank, it frequently happens that an operator fails to observe his fuel gauge and exhausts his supply of fuel at some inconvenient time and place. Furthermore, such gauges are subject to errors in calibration and sometimes fail to afford a correct indication of the condition of the fuel supply.

With the above considerations in view some motor vehicles and other fuel consuming devices have been equipped with a reserve fuel tank so that when the fuel in the main tank is exhausted, the operator may use the reserve supply before refueling. Such reserve tanks are expensive and also occupy considerable space which could otherwise be advantageously utilized.

A principal object of this invention is to provide an improved arrangement for affording an unmistakable warning of the near exhaustion of the supply of fuel in a fuel reservoir without causing material inconvenience to the user.

Another object of this invention is the provision of means for temporarily simulating the exhaustion of the contents of a fuel reservoir when a predetermined portion of the contents of the reservoir has been used so as to afford an unmistakable warning as to the condition of the contents of the reservoir.

Still another object of the invention is to provide a simple and inexpensive warning system for use in conjunction with liquid fuel tanks which system indicates the approaching exhaustion of the fuel supply and which affords an opportunity for the user to replenish his fuel supply before it is completely exhausted.

A still further object of this invention is the provision of an automatic warning system for indicating the approaching exhaustion of the supply of fuel in a fuel reservoir and which is adapted for mounting within the reservoir thereby to eliminate space consuming and expensive reserve reservoirs.

The invention in one form as applied to the main fuel reservoir of an automobile comprises an indicating reservoir disposed within the main reservoir and arranged so that fuel from the main reservoir flows through the indicating reservoir to the outlet so long as the level of fuel in the main reservoir is above a predetermined value, the flow through the indicating reservoir being substantially reduced or effectively stopped when the level of fuel in the main reservoir is reduced to the predetermined value, thereby to stall the automobile and by so doing to warn the operator of the impending exhaustion of his fuel supply. According to a feature of the invention normal flow of fuel through the main reservoir outlet is restored after a brief period by suitable control means which is effective to open a normally closed supply passage between the main and indicating reservoirs thereby to allow fuel to flow through the indicating reservoir at a rate comparable to the rate at which it is normally exhausted through the outlet.

For a better understanding of the invention reference may be had to the following description taken in conjunction with the accompanying drawing in which Figure 1 is a cross-sectional view of a portion of a main fuel reservoir to which the invention has been applied; Figure 2 is a perspective view of the indicating and control reservoirs and associated elements which comprise the invention; and Figure 3 is a cross-sectional view of the parts of Figure 2 which is similar to but in larger scale than the corresponding elements as depicted in Figure 1 and which depicts the fuel at a different level from that indicated in Figure 1.

With reference to Figure 1, the numeral 1 generally designates a main fuel reservoir having an upper section 1a and a lower section 1b welded together at 1c. Main reservoir 1 is supported by a plurality of metallic bands 2 which undergird the tank 1 and whose ends are affixed by bolts 3 to a plurality of transversely disposed support elements 4 which in turn are mounted by a plurality of bolts 5 to brackets 6. Brackets 6 are affixed by rivets 7 or by other suitable means to element 8 which could, for example, constitute a portion of the chassis of an automobile.

For the purpose of supplying fuel from main reservoir 1 to the engine of an automobile, for example, an outlet conduit 9 is provided. Outlet conduit 9 extends through an opening in the wall of the lower portion 1b of the main reservoir 1 and is arranged in fluid tight relation with respect thereto by suitable sealing means 10.

According to the invention an indicating reservoir 11 is secured to the bottom of main reservoir 1 by welding or otherwise and an end of outlet conduit 9 is welded or secured in some other known manner to the bottom of indicating reservoir 11. Disposed adjacent the indicating reservoir 11 is a control reservoir 12 in which is mounted a control float 13 which is supported by rod 14 on the opposite end of which is mounted valve means 15 which normally closes the supply port 16. When valve 15 is in the open position depicted in Figure 2, supply port 16 constitutes a means of communication between the indicating reservoir 11 and the main reservoir 1. Rod 14 is pivotally supported by bracket 17 which as shown is welded or otherwise secured to a wall of the indicating reservoir 11. Communication between control reservoir 12 and indicating reservoir 11 is by means of a metering port 18. The supply port 16 is constructed so that its cross-sectional area is substantially equal to the cross-sectional area of the inside of the outlet conduit 9. The metering port 18 on the other hand is of a much smaller cross-sectional area than that of the supply port 16 and the inside of the outlet conduit 9.

When the level of liquid is above the upper edge of the walls of the indicating reservoir 11 as is indicated in Figure 1, fuel normally flows from the interior of the indicating reservoir through the outlet conduit 9 to the device such as a gasoline engine which is being fed with fuel from the main reservoir 1. As fuel is exhausted from the indicating reservoir 11 such fuel is replenished through the top of the indicating reservoir 11 since this reservoir is at least partially open at the top. So long as the level of fuel in main reservoir 1 is above the upper edge of the walls of the control reservoir 12 the float 13 occupies its extreme uppermost position and the valve means 15 keeps the supply port 16 closed. As soon as the level of liquid in the main reservoir 1 is drawn down to a level equivalent to the upper edge of the walls of the indicating reservoir 11 the continued flow of fuel through the outlet conduit 9 depletes the supply of liquid within the indicating reservoir 11 and the engine being supplied with fuel from the reservoir 1 ceases to operate and simulates conditions which normally exist when the fuel supply is exhausted. In this manner the operator is warned of the near exhaustion of his fuel. Flow of fuel from control reservoir 12 into indicating reservoir 11 through metering port 18 begins when the level of fuel in the indicating reservoir 11 is reduced below that of the level of fuel in the control reservoir 12. Since the metering port 18 is of a much smaller cross-sectional area than the area of the inside of the main outlet conduit 9 the supply of fuel in indicating reservoir 11 is not replenished at a rate sufficiently fast by virtue of the flow through the metering port 18 to prevent the stalling of the engine supplied with fuel from the main conduit 9. However after a brief stalled period, which is predetermined as desired, fuel from control reservoir 12 flowing through metering port 18 lowers the level of liquid in control reservoir 12 sufficiently so that float 13 causes valve means 15 to open supply port 16. Thereafter fuel may flow normally from main reservoir 1 through the supply port 16, the indicating reservoir 11 and main outlet 9 to the engine. Thus operation of the engine may be resumed without substantial inconvenience to the operator who is thereby afforded an opportunity to replenish his fuel supply before the fuel in the main reservoir is completely exhausted.

It may be desirable for certain applications of the invention to provide means for preventing the possible interchange of fuel between the various reservoirs due to sudden starting or stopping or to bouncing of the vehicle to which the invention is applied. In order to minimize or to prevent such an occurrence, suitable baffles (not shown) could be applied to the indicating and control reservoirs.

While the relative sizes of the control and indicating reservoirs are not a critical feature of the invention it is generally desirable to construct the indicating reservoir so that its volume is substantially greater than that of the control reservoir. Furthermore, it is obvious that for a particular application of the invention, the various parts would be constructed and arranged so that after the supply port 16 is opened as described fuel would not flow from indicating reservoir 11 through metering port 18 to control reservoir 12 in sufficient quantity to cause float 13 to close supply port 16.

While I have shown and described a particular embodiment of the invention, I do not wish to be limited thereto and intend in the appended claims to cover all such changes and modifications as fall within the true spirit and scope of the invention.

What I claim as new and desire to secure by Letters Patent of the United States is as follows:

1. In combination, a main reservoir having an outlet, an indicating reservoir at least partially open at the top and disposed adjacent the bottom of said main reservoir with said outlet leading from the interior of said indicating reservoir to the outside of said main reservoir, a control reservoir at least partially open at the top and disposed adjacent the bottom of said main reservoir alongside said indicating reservoir, a metering port affording communication between said indicating and control reservoirs, a normally closed supply port in a wall of said indicating reservoir and arranged when open to afford communication between said indicating reservoir and said main reservoir, and means responsive to a reduction in the level of liquid in said control reservoir for opening said supply port.

2. In combination, a main reservoir having an outlet, an indicating reservoir at least partially open at the top and disposed adjacent the bottom of said main reservoir with said outlet leading from the interior of said indicating reservoir to the outside of said main reservoir, a control reservoir at least partially open at the top and disposed adjacent the bottom of said main reservoir alongside said indicating reservoir, a metering port affording communication between said indicating and control reservoirs, said metering port being of substantially less cross-sectional area than the cross-sectional area of said outlet, a normally closed supply port in a wall of said indicating reservoir and arranged when open to afford communication between said indicating reservoir and said main reservoir, and means responsive to a reduction in the level of liquid in said control reservoir for opening said supply port.

3. In combination, a main reservoir having an outlet, an indicating reservoir at least partially open at the top and disposed adjacent the bottom of said main reservoir with said outlet leading from the interior of said indicating reservoir to the outside of said main reservoir, a control reservoir at least partially open at the top and disposed adjacent the bottom of said main reservoir alongside said indicating reservoir, a metering port affording communication between said indicating and control reservoirs, a normally closed supply port in a wall of said indicating reservoir and arranged when open to afford communication between said indicating reservoir and said main reservoir, said supply port and said outlet being of comparable cross-sectional areas, and means responsive to a reduction in the level of liquid in said control reservoir for opening said supply port.

4. In combination, a main reservoir having an outlet, an indicating reservoir at least partially open at the top and disposed adjacent the bottom of said main reservoir with said outlet leading from the interior of said indicating reservoir to the outside of said main reservoir, a control reservoir at least partially open at the top and disposed adjacent the bottom of said main reservoir alongside said indicating reservoir, a metering port affording communication between said indicating and control reservoirs, said metering port being of substantially less cross-sectional area than the cross-sectional area of said outlet, a normally closed supply port in a wall of said indicating reservoir and arranged when open to afford communication between said indicating reservoir and said main reservoir, said supply port and said outlet being of comparable cross-sectional areas, and means responsive to a reduction in the level of liquid in said control reservoir for opening said supply port.

5. In combination, a main reservoir having an outlet, an indicating reservoir at least partially open at the top and disposed adjacent the bottom of said main reservoir with said outlet leading from the interior of said indicating reservoir to the outside of said main reservoir, a control reservoir at least partially open at the top and disposed adjacent the bottom of said main reservoir alongside said indicating reservoir, a metering port affording communication between said indicating and control reservoirs, a normally closed supply port in a wall of said indicating reservoir and arranged when open to afford communication between said indicating reservoir and said main reservoir, a float in said control reservoir, and valve means normally closing said supply port and responsive to a predetermined lowering of said float for opening said supply port.

References Cited in the file of this patent

UNITED STATES PATENTS

| | | |
|---|---|---|
| 2,284,997 | Svendsen | June 2, 1942 |
| 2,734,561 | Funkhouser | Feb. 14, 1956 |

FOREIGN PATENTS

| | | |
|---|---|---|
| 217,525 | Germany | Jan. 4, 1910 |